Jan. 18, 1938.  H. C. A. BEHR ET AL  2,105,778
AUTOMATIC ROASTER
Filed Jan. 28, 1937  2 Sheets-Sheet 1
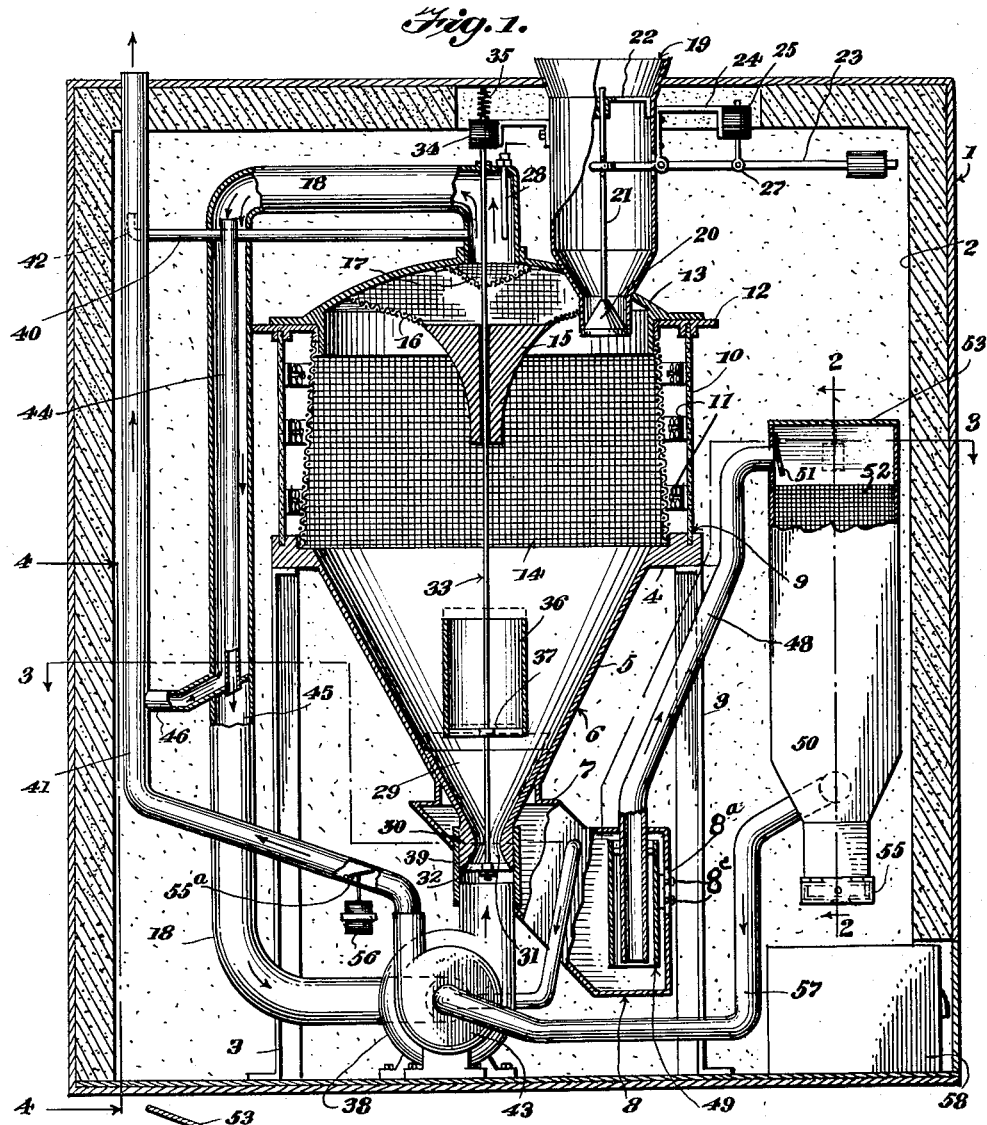
Inventors,
HARRY C. A. BEHR AND
JULES J. ECK.
By E. E. Vrooman & Leo,
His Attorneys.

Jan. 18, 1938.   H. C. A. BEHR ET AL   2,105,778
AUTOMATIC ROASTER
Filed Jan. 28, 1937   2 Sheets-Sheet 2

Inventors,
HARRY C. A. BEHR AND
JULES J. ECK.

By E. C. Vrooman & Co.,
His Attorneys.

Patented Jan. 18, 1938

2,105,778

UNITED STATES PATENT OFFICE 2,105,778

AUTOMATIC ROASTER

Harry C. A. Behr and Jules J. Eck, York, Pa., assignors to Yorktown Electric Roaster Manufacturing Corporation, York, Pa., a corporation of Pennsylvania Application January 28, 1937, Serial No. 122,860

11 Claims. (Cl. 34—34)

This invention relates to an automatic roaster for roasting different foods, such as coffee, and the like.

An object of this invention is the construction of a simple and efficient roaster of an upright or vertical type.

Another object of the invention is the construction of an efficient roaster which can be easily installed in a store or building for roasting automatically preferably small quantities of coffee, as the operator desires.

A further object is the construction of a coffee roaster which will operate automatically after receiving the beans, for efficiently roasting same and then automatically discharging the roasted coffee in predetermined quantities.

A still further object of the invention is the construction of a relatively compact roaster which is particularly adapted for efficiently roasting coffee in stores, whereby a customer can quickly and efficiently be supplied with fresh-roasted coffee in a minimum amount of time.

Another object of the invention is the construction of an automatic roaster in which a novel and efficient valve unit is employed, besides a particular arrangement of pipes or conduits, wherein the coffee is roasted and then cooled, prior to delivery, with the least amount of manual consideration possible.

With the foregoing and other objects in view, the invention comprises certain novel constructions, combinations and arrangements of parts as will be hereinafter fully described, illustrated in the accompanying drawings and more particularly pointed out in the appended claims.

In the drawings:

Figure 1 is a vertical, central sectional view of an automatic roaster constructed in accordance with this invention, a few parts being shown in side elevation.

Figure 2 is a sectional view taken on line 2—2, Figure 1, and looking in the direction of the arrows.

Figure 3:
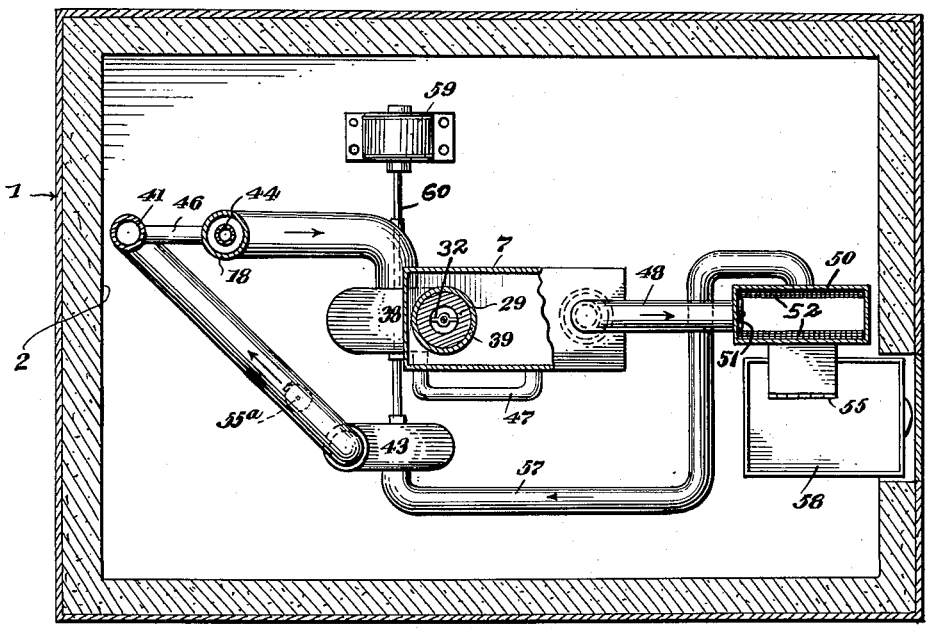
Figure 3 is a sectional view taken on line 3—3, Figure 1, and looking in the direction of the arrows.

Referring to the drawings, in which we have shown the preferred embodiments of our invention, I designates a suitable casing or cabinet in which our roasting mechanism is placed. The cabinet I is provided on its interior with a suitable insulation 2, which prevents the cabinet I from being heated by the heating means hereinafter described.

A suitable number of legs 3 are in the cabinet I, resting upon the bottom insulation, and these legs 3 support the horizontal rim 4 that is an integral part of the hopper-like bottom 5 of the container 6. The hopper-like bottom 5 is provided at its lower end with a horizontal flange 7, which flange 7 is the top part of roasted bean pan or receiving receptacle 8. The horizontal rim 4 is provided with preferably an annular socket 9 into which fits the lower end of shell 10. This shell 10 is non-conductive of heat as it is preferably made of a specifically processed asbestos substance, whereby it is also a good insulator, on which is suitably secured a plurality of ring-like electrical heating units 11. These heating units 11 are electrically connected by wires (not shown) to suitable wiring, including a master switch, whereby the operator can start or stop the operation of the entire roaster.

On the upper end of non-conducting shell 10 is positioned a horizontal rim 12; the shell 10 extending into a socket of this rim similar to socket 9, as will be clearly seen upon referring to Figure 1. A cover 13 is detachably mounted on rim 12. A shell-like screen 14 is within shell 10 with the heating units 11 between said screen and said shell, whereby the beans do not come in contact with the heating units. The screen 14 converges from its lower end to its upper end, whereby the roasting beans are maintained better in a whirlpool-like action during their roasting period. An inverted cone-like deflector 15 is suspended on screen 16 in the top of the container 6, and a second screen 17 is above screen 16 over the inlet end of the chaff pipe 18.

A suitable hopper 19 is placed upon cabinet I and extends through the cover 13, for supplying the beans to the container 6. This inlet hopper 19 is provided with a valve 20, normally closing its lower end, and extending upwardly from valve 20 is a valve rod 21 which slides within horizontal bracket 22. A lever 23 is pivotally supported upon bracket 24; said lever 23 has its inner end around valve rod 21, whereby the lever can raise and lower valve 20. A solenoid 25 is provided to actuate lever 23. Through the medium of unit 26 the solenoid 25 is connected at 27 to lever 23 so that when the solenoid is energized it will draw upward on lever 23 to open valve 20 and allow the coffee beans in hopper 19 to be automatically discharged into the container 6. The solenoid 25 is electrically connected in any standard manner to a timing unit, not shown.

A thermostat 28 is positioned preferably in the intake end of the chaff pipe 18 and extends downwardly into same; this thermostat is electrically connected to a suitable temperature control device, not shown.

It is to be understood that we use the term "pipe" in this specification and the appended claims in a broad sense, meaning any suitable conduit or passage that will perform the same advantageous function.

Figure 5:
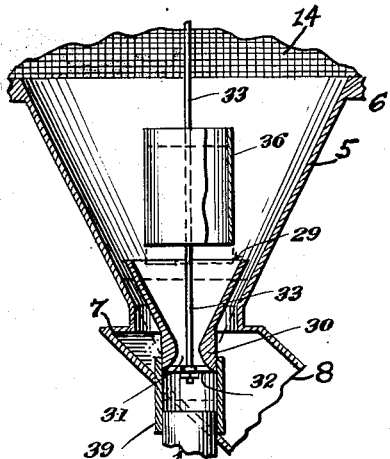
Figure 5 is a fragmentary sectional view, showing the primary valve of the main container in an open position.

A movable funnel-like valve 29 extends into the lower end of the hopper-like bottom 5. This valve 29 is thickened at 30 (Fig. 5) which produces a greatly restricted opening 31 that increases the velocity of air greatly as it passes into the container. This thickened part 30 has at its lower end a suitable web 32 to which is attached the lower end of valve rod 33. The upper end of valve rod 33 extends through the conical deflector 15, and is connected electrically to the solenoid 34. Normally the solenoid holds the valve 29 seated, but when the solenoid is de-energized spring 35 will draw upwardly on rod 33 causing valve 29 to assume an open position as clearly shown in Figure 5. On rod 33 is a large sleeve 36 which is held in position upon the rod by means of a web or bracket 37. This large sleeve 36 acts as a guide to direct the coffee beans upwardly through same and against the deflector 15 during the cycle of the beans in the container 6. The cycle of the beans is as follows: When the beans are discharged from hopper 19 into the container 6 they will normally drop down between the hopper-like bottom 5 and sleeve 36, then as they come in contact with the powerful current of air, forced through primary blower 38 into the container, the beans will be picked up and forced upwardly through sleeve 36, then against the deflector 15, turning and moving downwardly between the bottom 5 and sleeve 36, to continue the cycle of movement during the roasting period.

The primary blower 38 (Fig. 4) is connected by sleeve 39 to the reduced or "nozzle" portion 30 of the valve 29. However, the valve 29 is slidably movable in this sleeve 39, as will be seen by comparing the closed position in Fig. 1 and the open position in Fig. 5.

The chaff-pipe 18 extends downwardly from the top of container 6 with its lower end opening preferably into the side of blower 38. A bleeder pipe 40 has its inner end opening into the intake end of chaff-pipe 18, with its outer end preferably bent upwardly within the primary exhaust pipe 41 as indicated by dotted line 42. The primary exhaust pipe 41 is open to the outer atmosphere at its upper end, whereas its inner end is connected to the auxiliary blower 43. An interposed pipe 44 (Fig. 1) is placed in the upper portion of the chaff-pipe 18, with its lower end extending through a partition 45, which partition is across the interior of the chaff-pipe. As seen in Figure 1, the interposed pipe extends a short distance below said partition 45. The greater portion of the chaff will pass down around the outside of the interposed pipe 44, discharging through branch pipe 46 into the main exhaust pipe 41, while at the same time heated air will be taken in at the upper end of the interposed pipe 44 and thence discharged into the chaff-pipe 18 below its partition 45. The bleeder pipe 40 carries off practically all the smoke that is created in the container 6.

The pan or receiving receptacle 8 is provided for receiving the roasted beans that are discharged from the container 6. A smoke pipe 47 has its upper end opening into the top portion of the receiving receptacle 8 with its lower end in communication with the primary blower 38. A conveying pipe 48 has its lower end extending into the receiving receptacle 8, preferably through the top thereof. On the end of the conveying pipe 48 within receiving receptacle 8 is a vacuum sleeve 49. This sleeve extends, at its lower end, slightly below the inner end of pipe 48. The beans are sucked up through pipe 48 and discharged into the cooling receptacle 50. In the cooling receptacle 50, over the discharge end of pipe 48, is an apertured flap valve 51. The cooling receptacle 50 is provided with a pair of screens 52 (Fig. 2), which screens are secured at their upper and lower ends to the sides of the cooling receptacle, but are spaced from said cooling receptacle between their ends as shown in Fig. 2. A cover 53 is hingedly mounted on the top of the cooling receptacle and is actuated through the medium of a solenoid unit 54. A discharge cover 55 is pivotally mounted on the lower end of cooling receptacle 50. The function of flapper or flutter valve 55a is automatic and controlled through the solenoid 56; that is, when the coffee is to be discharged the solenoid closes the flapper or flutter valve 55a. As long as this flutter valve 55a is open cover 55 is held closed by suction and when the flutter valve is closed, the vacuum is automatically removed from cover 55 and the coffee stored in receptacle 50 is released by gravity. A pipe 57 is in communication at one end with the lower portion of the cooling receptacle 50 and its other end is in communication with the auxiliary blower 43. This pipe serves to clean and remove hot air from the roasted beans, as well as removing smoke and any other undesirable substance. The cooled, roasted coffee beans are finally discharged into the "drawer" or receptacle 58.

Figure 4:
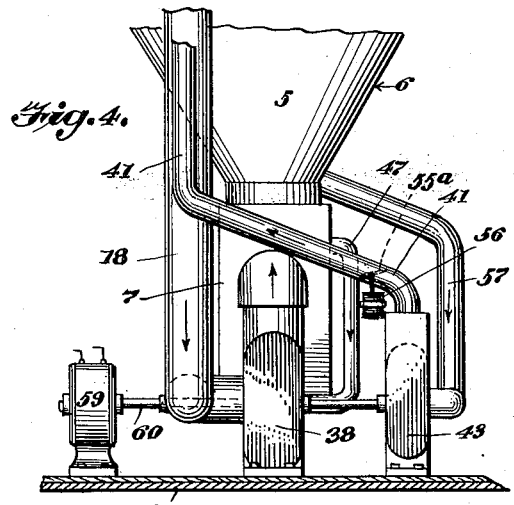
Figure 4 is a sectional view taken on line 4—4, Figure 1, and looking in the direction of the arrows.

As seen in Figure 4, a suitable motor 59 is placed in the cabinet 1 and the shaft 60 of said motor extends through the two blowers 38 and 43 whereby the common fans of these blowers are operated simultaneously. The motor 59 is suitably wired with the solenoid units, etc., of the apparatus (not shown) so that the entire mechanism will work automatically during the complete roasting process.

It will be seen upon referring to Figure 1 that by reason of the substantially inverted conical shape of the large screen 14, its sides will more easily cause the downward movement of the beans during their cycle of movement within the container, this movement also being furthered by the beans being blown so fast against the curved sides of the deflector 15. In other words, the peculiar shape of the deflector with the spreading out, so to speak, of screen 14 towards its bottom cooperate to cause the beans to have a more positive action in moving downwardly after being blown at a great speed through the guiding sleeve 36.

The roasted coffee beans will fill the cooling receptacle 50, between the screens 52. The air will pass down between the walls of the receptacle and the screens, which portion are not blocked by the coffee beans. Therefore, it will be seen that while the beans are in a compact position between the screens, there is space for the air to freely circulate, substantially around the packed or deposited beans, whereby the roasted beans are more quickly and efficiently cooled.

The sleeve 49 may be adjusted upon pipe 48, since slot 8a (Fig. 1), in receptacle 8, allows the bolt 8c to be adjusted up or down, for accomplishing the adjustment. Then when the nuts of the bolts 8c are tightened the sleeve 49 will be retained in the suggested position. This sleeve prevents the beans from clogging at the intake end of pipe 48, since the air sucked between sleeve 49 and pipe 48 causes a free action at the intake end of pipe 48.

Figure 6:
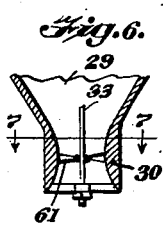
Figure 6 is a fragmentary sectional view of the valve, showing another embodiment of our invention.
Figure 7:
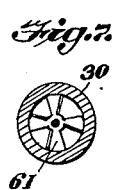
Figure 7 is a sectional view taken on line 7—7, Figure 6, and looking in the direction of the arrows.

If it is desired, an air whirler 61 (Figs. 6 and 7) may be fixedly secured within the valve 29, which causes the air to circulate upward, into the container, thereby preventing any clogging of the beans. This whirler 61 may have any number of fan-like blades and may be secured in any suitable manner.

Figure 8:
Figure 8 is a sectional view of the valve, showing another embodiment of our invention.

In Figure 8 we have shown another embodiment of the valve 29a, in which there is no thickened portion, as 30 (Fig. 6); this embodiment has the air whirler 61a fastened in the lower reduced end of the valve, which may be desirable in some instances.

If it is desired, when employing the air whirler 61 or 61a, the large sleeve 36 may be omitted, as the operator desires. However, in all of our embodiments we preferably employ the valve rod 33, and solenoid 34, in the construction of our machine.

While we have described the preferred embodiments of our invention and illustrated the same in the accompanying drawings, certain minor changes or alterations may appear to one skilled in the art to which this invention relates during the extensive manufacture of same, and we, therefore, reserve the right to make such changes or alterations as shall fairly fall within the scope of the appended claims.

What we claim is:

1. In an automatic roaster, the combination of a container provided with a discharge end, a blower under said end, a valve slidably mounted in said container and on said blower, and said valve being reduced in interior diameter intermediate its ends.

2. In an automatic roaster, the combination of a container provided with a discharge opening, a blower discharging into said discharge opening, a valve unit in said discharge opening and having a portion extending into a portion of said blower, a guiding sleeve unit, means connecting said guiding sleeve unit to said valve unit, and a deflector in said container directly above said guiding sleeve unit.

3. In an automatic roaster, the combination of a container provided with a discharge opening, a blower under said discharge opening, a valve slidably mounted partly in said discharge opening of the container and in said blower, coffee guiding means above said valve and movable therewith, and a deflecting unit in said container above said guiding means, whereby coffee passing through said guiding means will be directed against said deflecting unit.

4. In an automatic roaster, the combination of a container provided with a discharge opening, a blower under said discharge opening, a valve movably mounted in said discharge opening and said blower, a valve rod secured at its lower end to said valve, an open ended sleeve on said valve rod above said valve, and an inverted cone-shaped deflector in said container in alignment with said valve and said sleeve.

5. In an automatic roaster, the combination of a container provided with a discharge opening, a blower under said opening, a funnel-shaped valve in said opening and partly in said blower, a vertical valve rod in said container and having its lower end extending into said valve and fastened thereto, a guiding sleeve around said valve rod and fixedly secured thereto above said valve, an inverted cone-like deflector in said container with said valve rod passing therethrough, and a screen secured to said container and connected also to said deflector, whereby said deflector is suspended upon said screen.

6. In an automatic roaster, the combination of a container provided with a discharge opening, a bodily-movable valve working in said discharge opening and provided with constricting means whereby air is forced into the container at a high velocity, coffee guiding means in said container above said valve means and movable vertically therewith, deflector means in said container above said guiding means, and means for forcing air into said valve whereby beans contained in said container will be forced through said guiding means and against said deflector means.

7. In an automatic roaster, the combination of a container provided with a discharge opening, a blower discharging into said discharge opening, a chaff pipe opening at one end into said container and at its other end into said blower, a bleeder pipe connected to said chaff pipe, an interposed pipe in said chaff pipe, and a discharge pipe opening to the outer atmosphere connected to said bleeder pipe and said chaff pipe.

8. In an automatic roaster, the combination of a container provided with a discharge opening, a blower discharging into said discharge opening, a chaff pipe opening at its upper end into the top of said container and at its lower end into said blower, an exhaust pipe, a bleeder pipe extending at its outer end into said exhaust pipe and having its inner end opening into said chaff pipe near its inlet end, an interposed pipe in said chaff pipe, said chaff pipe provided intermediate its ends with a transverse partition, said interposed pipe having its lower end extending through said partition, and said chaff pipe provided with outlet means connected to said exhaust pipe.

9. In an automatic roaster, the combination of a container, a receiving receptacle under said container, a cooling receptacle contiguous to said container, a conveyor pipe having its lower end extending down into said receiving receptacle, a bodily-movable vacuum sleeve on said lower end of the conveyor pipe within said receiving receptacle, said conveyor pipe opening at its upper end into said cooling receptacle, and means producing an air flow in said conveyor pipe for conveying coffee therethrough.

10. In an automatic roaster, the combination of a container, a cooling receptacle contiguous to said container, a pair of screens within said cooling receptacle and having their ends secured thereto, said screens being spaced from said receptacle intermediate their ends, a solenoid actuated cover on the top of said cooling receptacle, a discharge cover on the bottom of said cooling receptacle, means for supplying roasted beans from said container to said cooling receptacle, and a flap valve in said cooling receptacle over the discharge end of said supplying means.

11. In an automatic roaster, the combination of a receptacle, a receiving receptacle under said first-mentioned receptacle, a cooling receptacle contiguous to said first-mentioned receptacle, a conveyor pipe having its lower end extending down into said receiving receptacle, a sleeve open at its top and positioned within said receiving receptacle and spaced around said conveyor pipe, said receiving receptacle provided in its side with a slot, bolts secured to said sleeve and positioned in said slot, nuts on said bolts clamping on said receiving receptacle, and said conveyor pipe opening at its outer end into said cooling receptacle.

HARRY C. A. BEHR.
JULES J. ECK.